US005666550A

United States Patent [19]

Sulzbach

[11] Patent Number: 5,666,550
[45] Date of Patent: Sep. 9, 1997

[54] BUS OPERATION CIRCUIT USING CMOS RATIO LOGIC CIRCUITS

[75] Inventor: Timothy Jon Sulzbach, Chittenden County, Vt.

[73] Assignee: International Business Machines Corporation, Armonk, N.Y.

[21] Appl. No.: 477,680

[22] Filed: Jun. 7, 1995

[51] Int. Cl.⁶ .................................................. G06F 13/00
[52] U.S. Cl. ............... 395/800.23; 395/308; 395/800.01; 326/86; 364/232.8; 364/240.2; 364/242.6; 364/DIG. 1
[58] Field of Search ...................... 395/800, 284, 395/308, 311, 550, 856, 860, 287, 293, 299, 375, 726, 728, 732; 340/146.2, 825.5; 364/137, 131–134; 371/5.4, 67.1, 70, 71; 326/17, 37, 63, 81, 86

[56] References Cited

U.S. PATENT DOCUMENTS

| | | | |
|---|---|---|---|
| 3,755,689 | 8/1973 | Elmer et al. | 326/97 |
| 3,935,475 | 1/1976 | Margolies | 327/144 |
| 4,020,459 | 4/1977 | Coomer | 371/51.1 |
| 4,231,086 | 10/1980 | Tarbox et al. | 395/289 |
| 4,500,988 | 2/1985 | Bennett et al. | 326/86 |
| 5,197,143 | 3/1993 | Lary et al. | 395/309 |
| 5,218,562 | 6/1993 | Basehore et al. | 364/728.03 |
| 5,353,424 | 10/1994 | Partovi et al. | 395/455 |
| 5,467,473 | 11/1995 | Kahle et al. | 395/800 |
| 5,471,189 | 11/1995 | Dietz et al. | 340/146.2 |
| 5,524,270 | 6/1996 | Haess et al. | 395/880 |

*Primary Examiner*—Alpesh M. Shah
*Attorney, Agent, or Firm*—Whitham, Curtis, Whitham & McGinn; Robert A. Walsh

[57] ABSTRACT

A match bus operation circuit is disclosed for detecting load/store conflicts created by out-of-order instruction execution in a superscalar microprocessor having first and second busses. A ratio logic compare circuit generates a match bus indicating a match or conflict between the first and second busses. A ratio logic priority circuit is coupled to the ratio logic compare circuit for receiving the match bus and generating a priority bus indicating a first match of the match bus. A ratio logic mask circuit is also coupled to the ratio logic compare circuit for receiving the match bus and generating a mask bus that flags all instructions after the first match for discarding. A ratio logic multiple hit circuit is also coupled to the ratio logic compare circuit and indicates whether more than one instruction has matched.

8 Claims, 15 Drawing Sheets

BUS OPERATION CIRCUIT USING CMOS RATIO LOGIC CIRCUITS

BACKGROUND OF THE INVENTION

1. Field of the Invention

The present invention generally relates to logic circuits, and, more particularly, to ratio logic circuits that increase the speed of a match bus operation in a superscalar microprocessor.

2. Description of the Related Art

Modern processors incorporating superscalar architecture allow a computer to execute multiple instructions out-of-order, but complete the instructions in program order to maintain program correctness. The architecture must be implemented within the constraints of a highly manufacturable die size and is implicitly required to operate at a high internal clock rate.

An instruction sequence with the "load" following the "store" in program order causes a load/store conflict in which the load instruction may have incorrect data. In these superscalar processors, the Load/Store Conflict (LSC) unit resolves problems created by out-of-order execution. The LSC compares memory dependencies (i.e., addresses) of instructions and flags any conflicts. These flags are then used to flush or discard the conflicting load instruction and all following instructions that have been dispatched.

Some have used standard CMOS (complementary metal-oxide semiconductor) logic cells such as NAND, NOR, XOR, and inverter gates to implement these operations. These bus operations, however, take about 3–4 gate delays (approximately 1000 pico-seconds (ps) in current technology) to implement. Unfortunately, these delay times are much to high for superscalar machines.

Other have tried bi-polar transistor designs, using TTL (transistor-transistor logic) or ECL (emitter-coupled logic) to increase bus speed. However, the bi-polar designs present heat, voltage, power, and compatibility problems with existing CMOS circuits.

In light of the foregoing, there exists a need for increasing the speed of the match bus operation to accommodate superscalar processor architecture, by minimizing the delay of compare and pattern detection operations on wide data width busses.

SUMMARY OF THE INVENTION

The present invention is directed to a bus operation architecture and method that substantially obviates one or more of the problems due to the limitations and disadvantages of the related art.

The bus operation architecture of the present invention may be utilized in many microprocessors having various bit width data busses. By way of example, the present invention is described with reference to the 615 PowerPC microprocessor (PowerPC is a registered Trademark of IBM Corporation). In the PowerPC bus operations, the instruction sequence queue has twelve entries that must be compared to the current instruction's memory address dependency. All twelve entries are compared to the current address at the same time, creating a twelve bit bus of match data.

This match data bus is used for several operations. In a multiple hit compare operation, the bus is checked for more than one match bit. In a second operation the bus looks for the first match bit in execution order of the twelve instructions and mark this as the highest priority of the matches. A third operation looks for the first match on the bus and marks that and all following instructions to be flushed or discarded as they contain incorrect data.

To achieve these and other advantages and in accordance with the purpose of the invention, as embodied and broadly described, the invention provides for a match bus operation circuit in a superscalar microprocessor having first and second busses, comprising: a ratio logic compare circuit for generating a match bus indicating matches between the first and second busses; a ratio logic priority circuit coupled to the ratio logic compare circuit for receiving the match bus and for generating a priority bus indicating a first match of the match bus; a ratio logic mask circuit coupled to the ratio logic compare circuit for receiving the match bus and generating a mask bus that flags all instructions after the first match for discarding; and a ratio logic multiple hit circuit coupled to said ratio logic compare circuit for indicating whether more than one instruction has matched.

In another aspect, the invention provides for a method of bus operations in a superscalar microprocessor having first and second busses, the method comprising the steps of (1) comparing the first and second busses for generating a match bus indicating a match between the first and second busses; (2) receiving the match bus and generating a priority bus indicating a first match of the match bus; (3) receiving the match bus and generating a mask bus that flags all instructions after the first match for discarding; and (4) indicating whether more than one instruction has matched.

It is to be understood that both the foregoing general description and the following detailed description are exemplary and explanatory and are intended to provide further explanation of the invention as claimed.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1A:
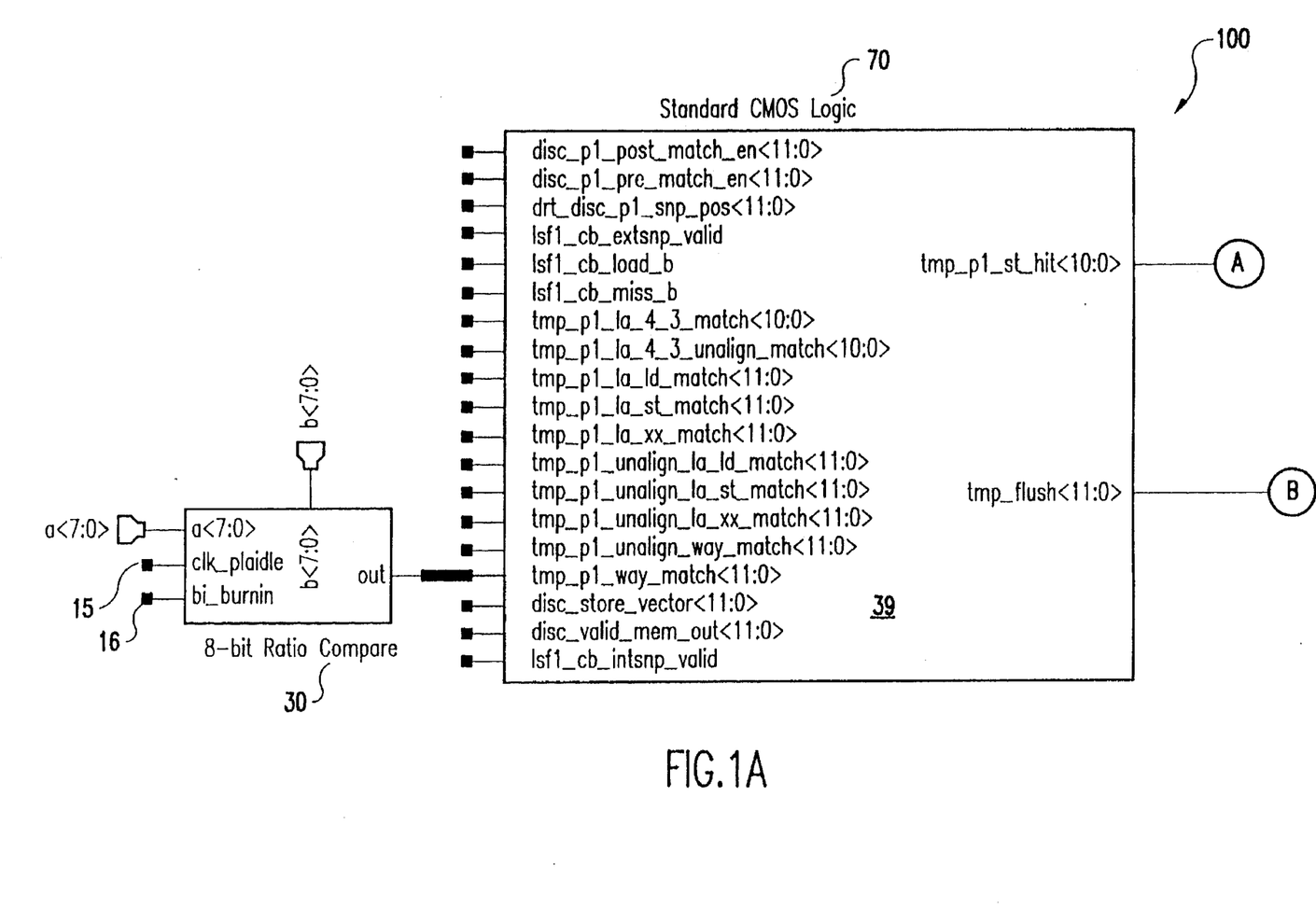
FIGS. 1A–1B illustrates a bus operation sequence in accordance with the present invention.
Figure 1B:
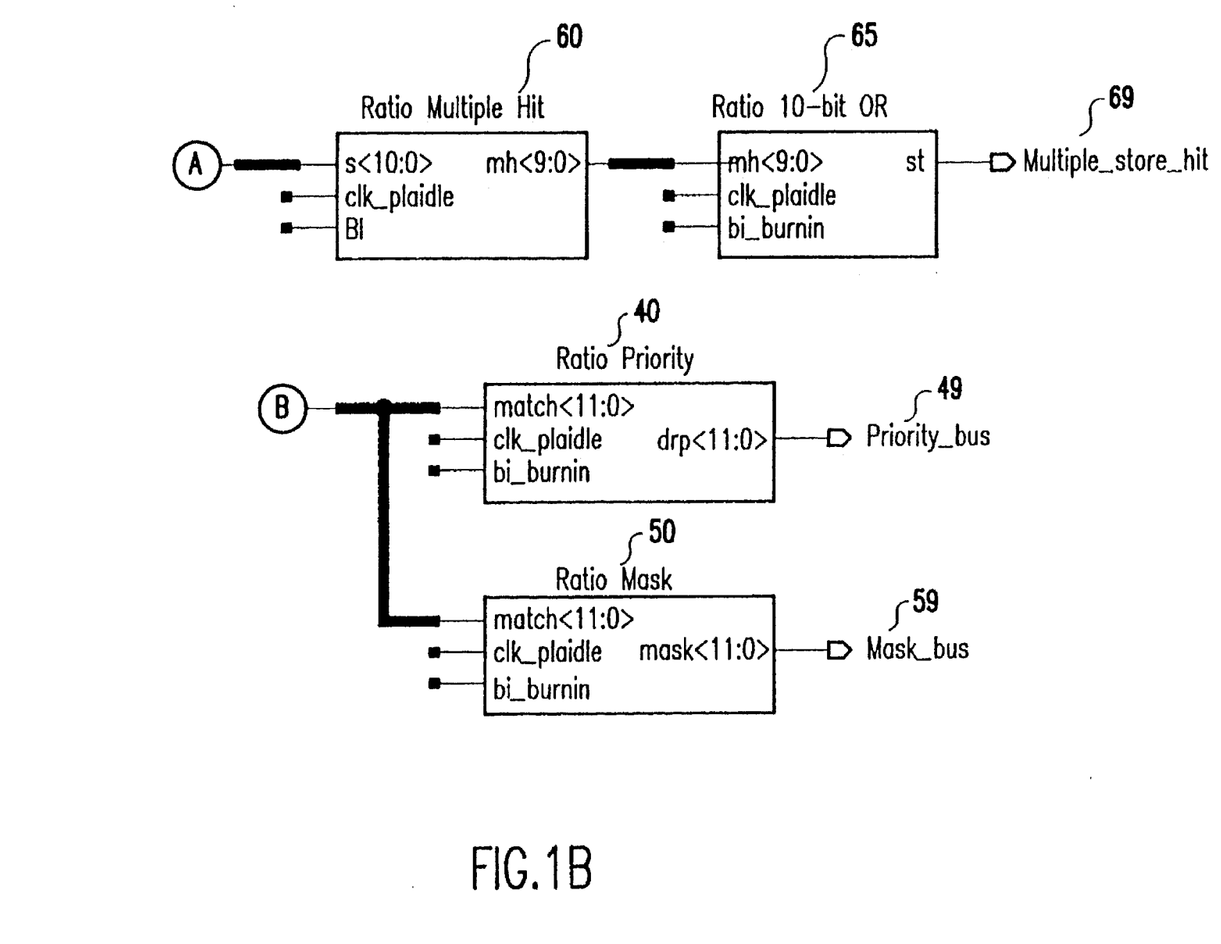

Referring now to the drawings, and more particularly FIGS. 1A–1B, there is shown a bus operation architecture 100 according to the present invention, generally comprising a compare circuit 30, a priority circuit 40, a mask circuit 50, and a multiple hit circuit 60. Each of the circuits uses ratio logic and all the circuits interface with the standard CMOS logic circuits 70 of a microprocessor.

The present invention will first be described generally with respect to FIG. 1, followed by a more detailed discussion of the ratio logic OR and AND/OR circuits. Lastly, each of the compare 30, priority 40, mask 50, and multiple hit 60 circuits will be described in greater detail.

For simplicity and ease of discussion, the following disclosure is based a situation where the processor stores twelve instructions for execution (e.g., in a PowerPC microprocessor), but due to out-of-order execution capabilities, they may not be stored in program order. It is understood, however, that the teachings of the present invention may be applied to any processor having a plurality of instructions stored for execution.

Referring to FIGS. 1A–1B, the bus operation sequence begins when the memory dependencies are checked between the stored instructions and the current instruction for possible conflicts by compare circuits such as the ratio logic compare circuit 30. The outputs of these compare circuits is a twelve bit bus of match data 39 (i.e. "match<11:0>" in FIGS. 1A–1B, block 70) with each bit representing a stored instruction.

This match bus 39 is input to priority circuit 40, which generates a priority bus 49 (i.e., "drp<11:0>" in FIGS. 1A–1B) indicating the first match for a possible conflict. The match bus 39 is also input to mask circuit 50, which generates a mask bus 59 (i.e., "mask<11:0>" in FIGS. 1A–1B) that flags the instructions after a conflict that must be flushed or discarded because they have incorrect data.

Finally, the multiple hit circuit 60 is used to indicate if more than one instruction has matched. In operation, each bit of the input bus is individually compared to see if it is a logical 1 and any other bit on the input bus is a logical 1, indicating a multiple hit that is stored in register 69.

The present invention utilizes ratio OR and/or ratio AND/OR topologies, or variations thereof, in each of the above described circuits. These base circuits will now be described.

Figure 2:
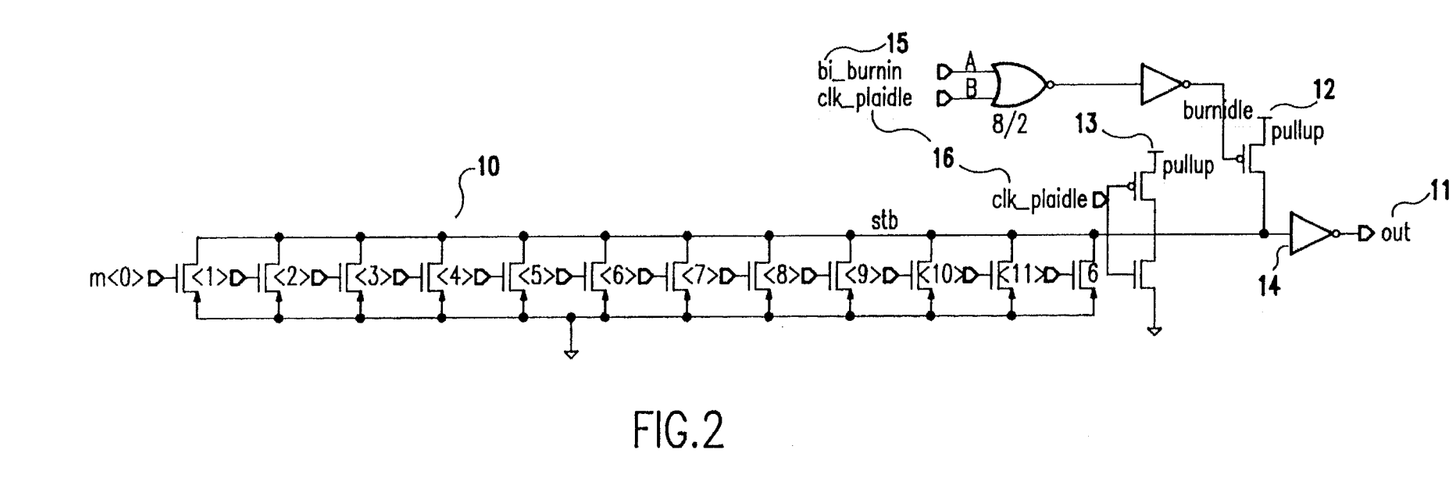
FIG. 2 illustrates a ratio logic OR circuit in accordance with the present invention.

In FIG. 2, there is shown a ratio logic OR circuit 10 in accordance with the present invention. The ratio OR circuit in FIG. 2 has twelve inputs, m<0:11>, and one output 11.

The functional OR circuit produces a logical 1 at the output 11 if any one of the inputs m<0:11> is a 1. The circuit produces this result when any one of the inputs turns on its corresponding NFET, Q<0:11>, which overpowers the PFET pullups 12 and 13 and pulls down the intermediate node labeled "stb" to a logical 0. The signal then passes through the output inverter 14 which produces the logical 1. If none of the inputs are at a logical 1, then the intermediate node "stb" is held high at a logical 1 by the PFET pull-ups and then inverter 14 passes the logical 0.

In FIGS. 1A–1B, the input signals clk_plaidle 15 and bi_burnin 16 are chip level power reduction signals. The signal clk_plaidle 15 is used to turn off the circuit during idle periods. The bi-burnin signal 16 is used to reduce the power of the circuit during high voltage burn-in testing.

Each of the remaining circuits to be discussed also have input signals clk_plaidle and bi_burnin, and the respective signals function the same in each of the below described circuits.

The PFET, NFET, and inverter sizes are set to balance the rise and fall times of the output, as well as produce a sufficient down level for the intermediate node. By way of example and not by limitation, to achieve rise and fall times between about 400–500 ps, one would utilize PFETs with a width/length ratio of about 4, NFETs with a width/length ratio of about 12, and inverters with a P vs N strength of about 1:2. It is understood that various other device sizes may be utilized and are considered to be within the scope of this invention.

Figure 3:
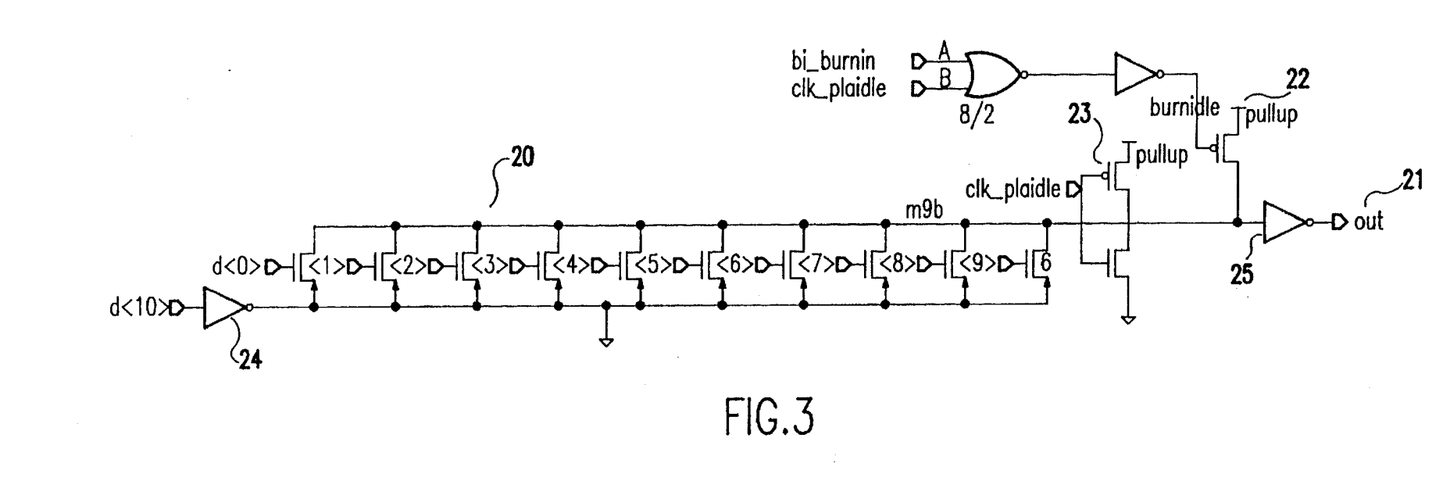
FIG. 3 illustrates a ratio logic AND/OR circuit in accordance with the present invention.

FIG. 3 illustrates a ratio logic AND/OR circuit 20 in accordance with the present invention. The ratio AND/OR circuit 20 produces a logical 1 when the first input signal on the bus is a 1 and any one of the other input signals is also a 1.

Specifically, AND/OR circuit 20 has eleven inputs, d<0:10>, and one output 21. The circuit functions in the same way as the ratio OR circuit 10 in FIG. 2; except that it only produces a logical 1 if d<10> is a 1 and any of the other inputs, d<0:9>, is also a 1. The ratio AND/OR circuit 20 derives its name from this particular operation, i.e., d<10> and d<9> or d<8> or d<7> . . . or d<0>. Basically, the circuit compares the first signal with an OR of all the other functions.

If d<10> is a 1 then inverter 24 produces a logical 0 at the node labeled "s10b" in FIG. 3. Now, if any of the other inputs, d<0:9>, are also a logical 1, then the intermediate node labeled "m9b" will be pulled down to a logical 0 and the following inverter 25 will produce a logical 1 at the output 21. In a manner similar to that disclosed with respect to FIG. 2, the intermediate node "m9b" is pulled down when any one of the inputs turns on its corresponding NFET which overpowers the PFET pullups 22 and 23. The PFET, NFET, and inverter sizes are chosen in the same manner and with the same considerations as in the ratio OR circuit 10 of FIG. 2.

Figure 4:
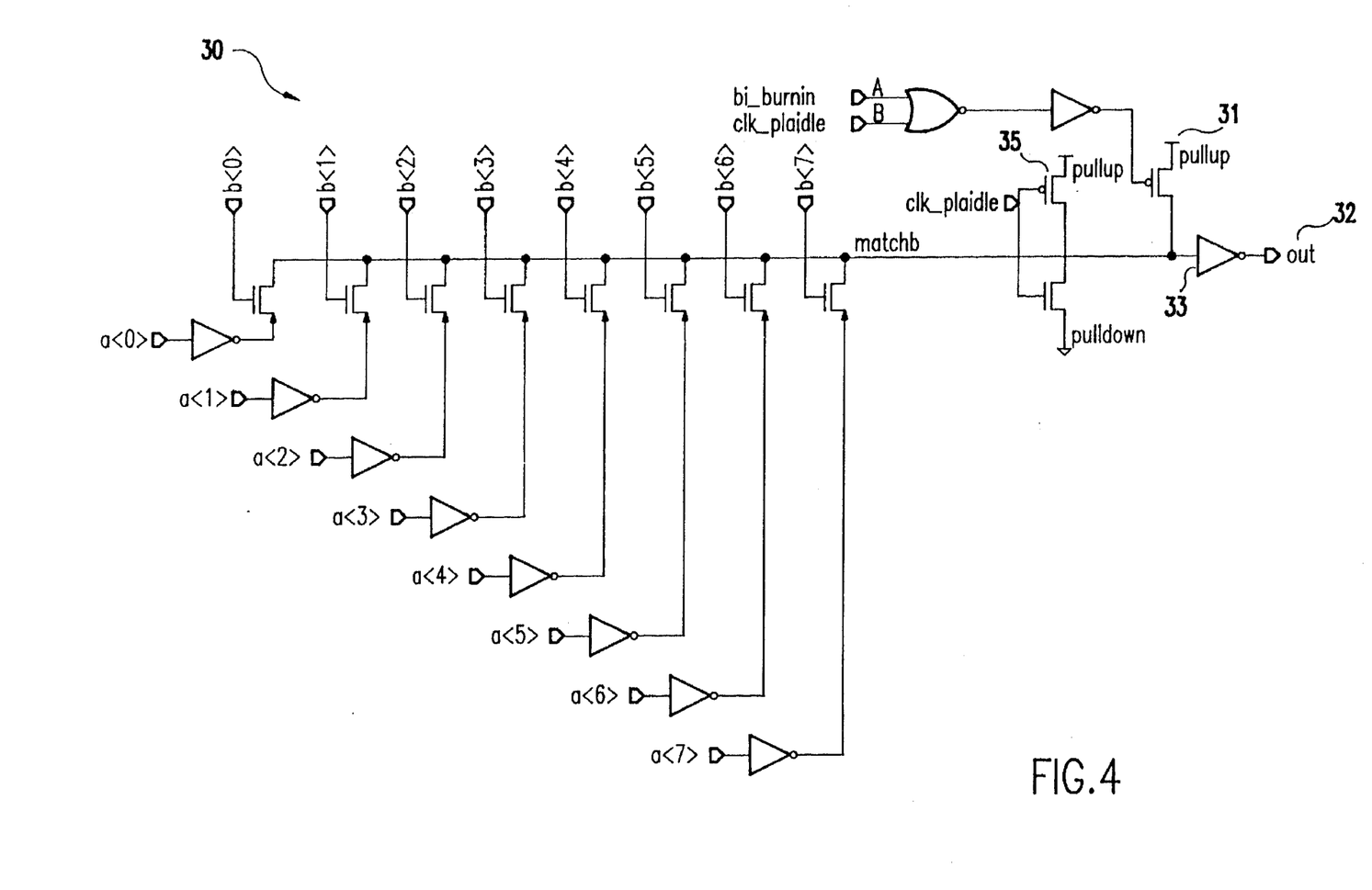
FIG. 4 illustrates a compare circuit in accordance with the present invention.
Figure 5A:
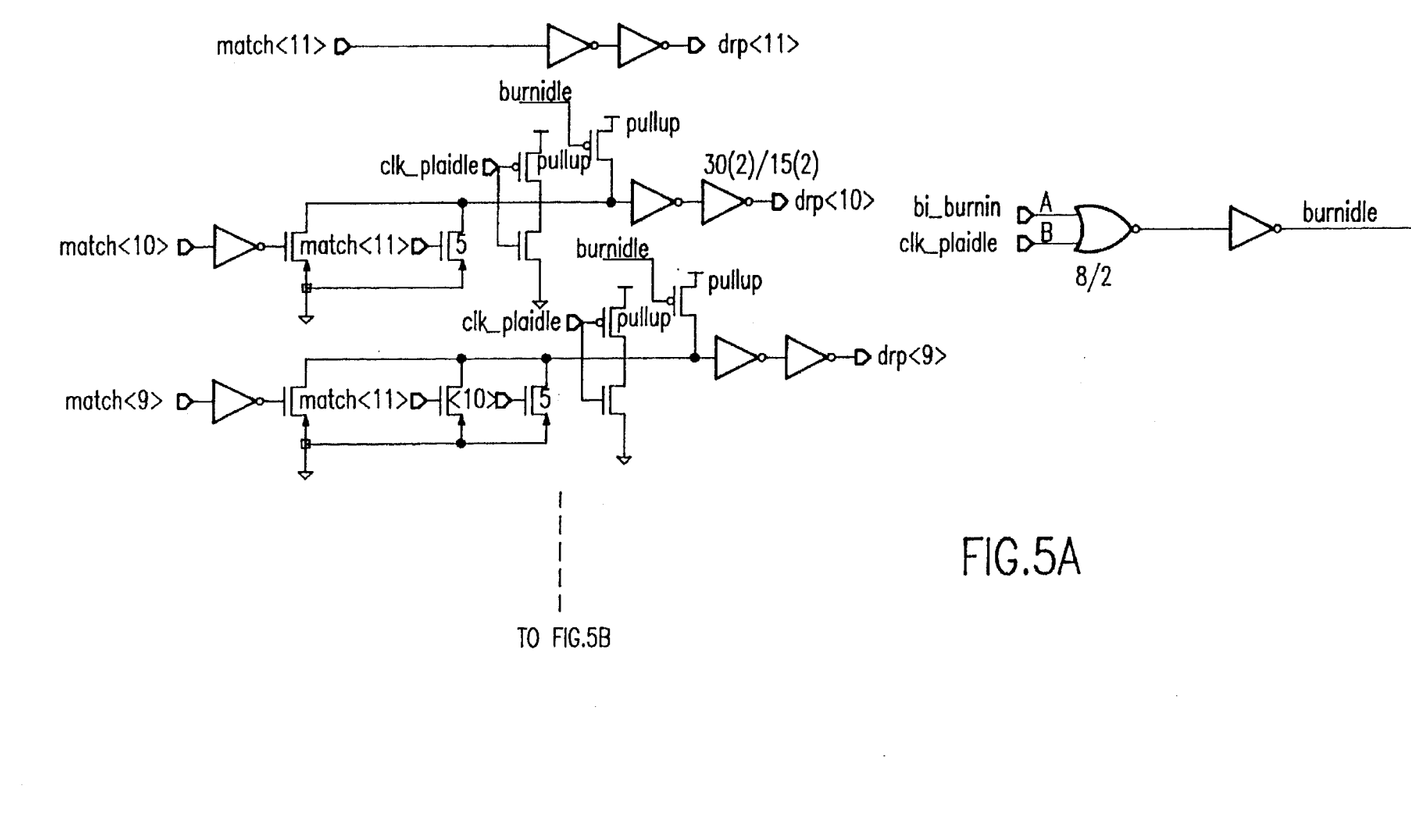
FIGS. 5A–5D illustrates a priority circuit in accordance with the present invention.
Figure 5B:
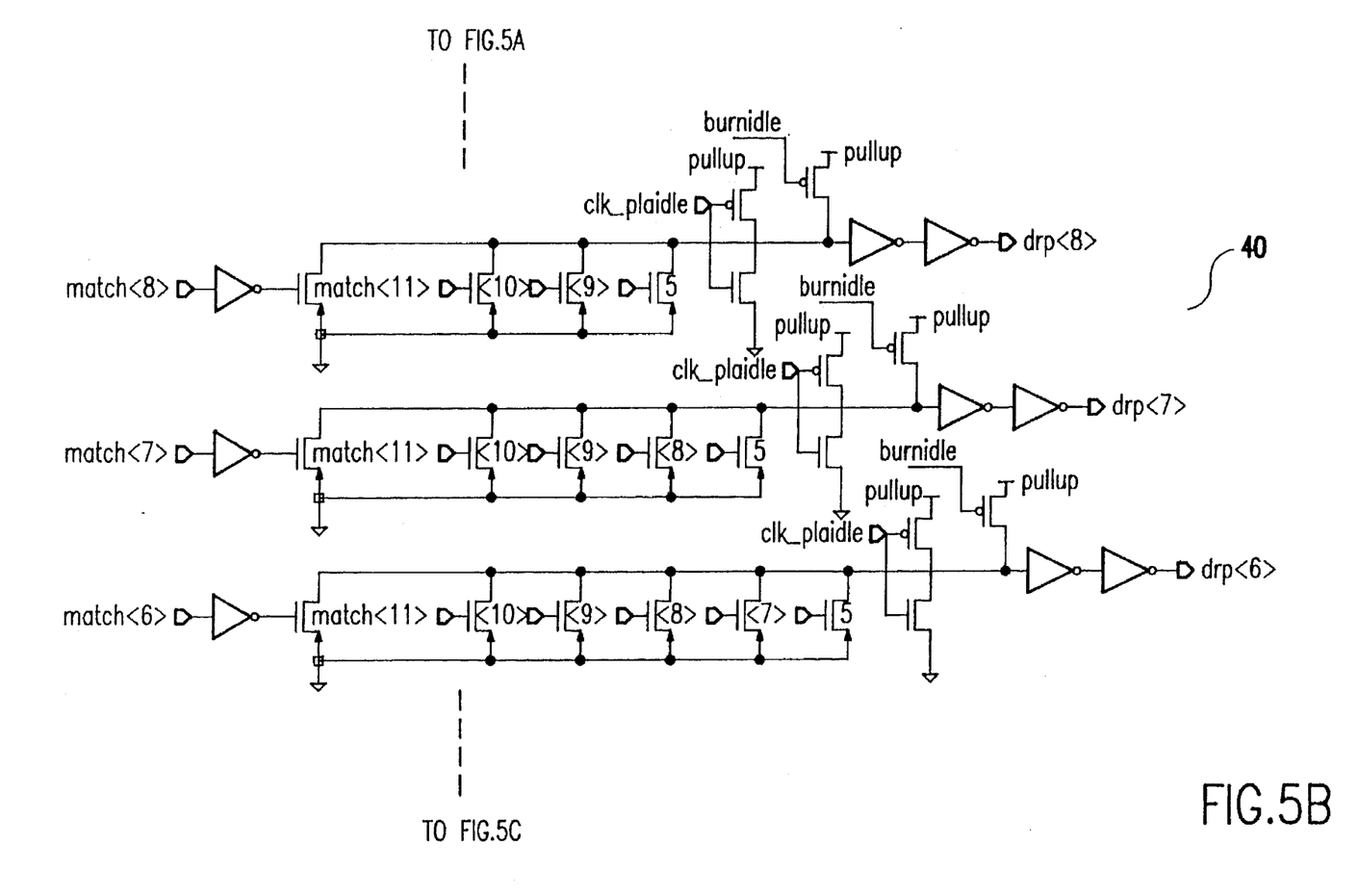
Figure 5C:
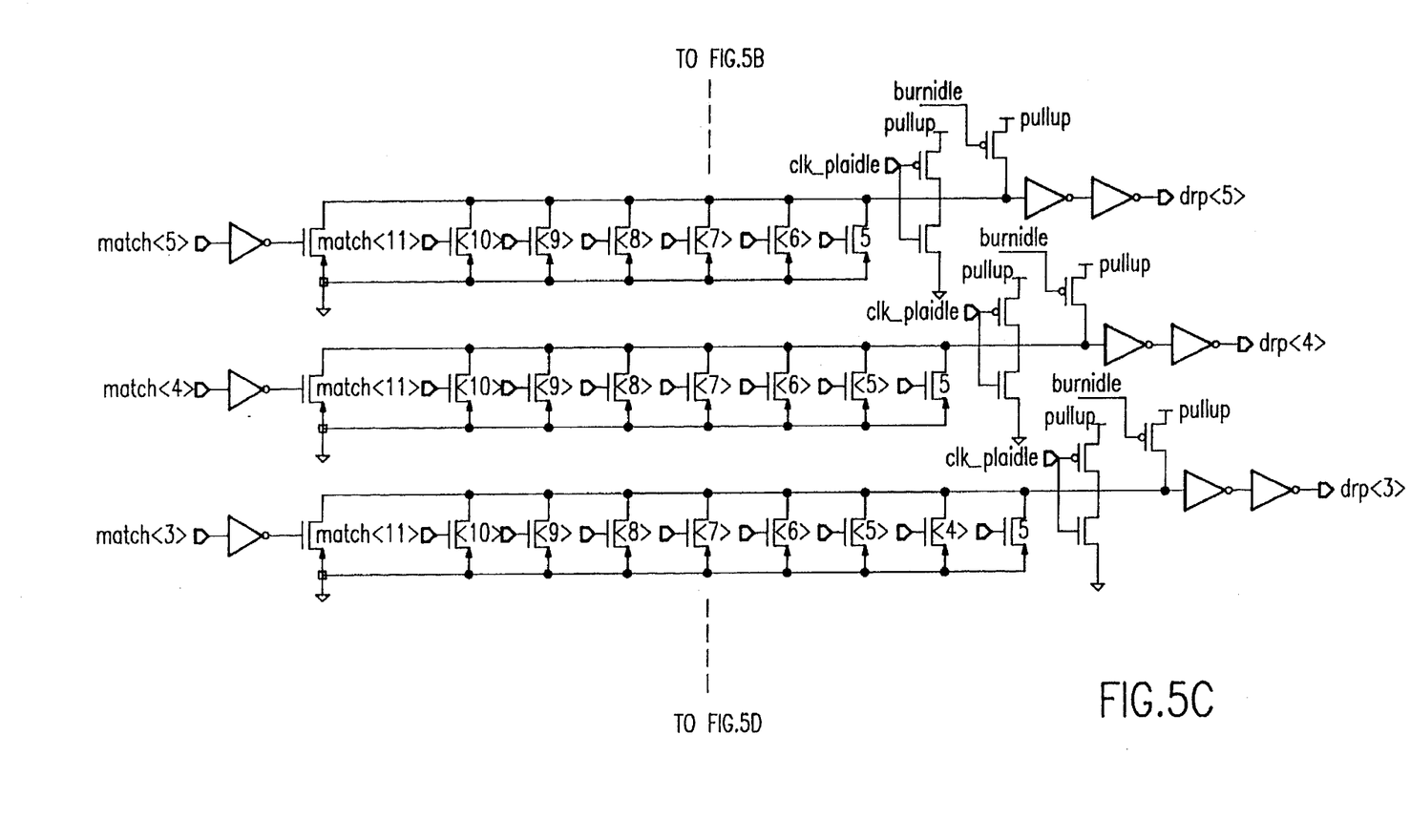
Figure 5D:
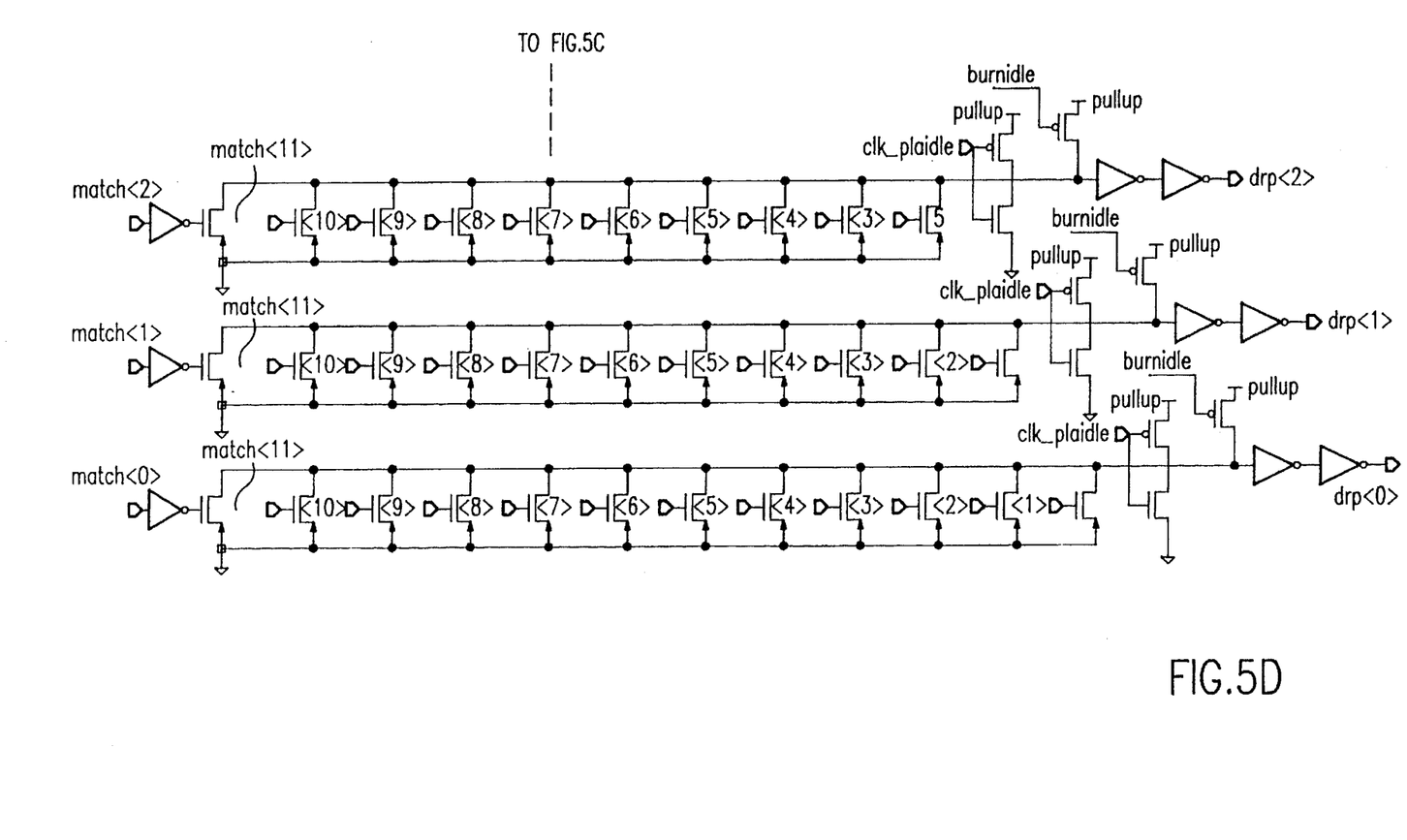
Figure 6A:
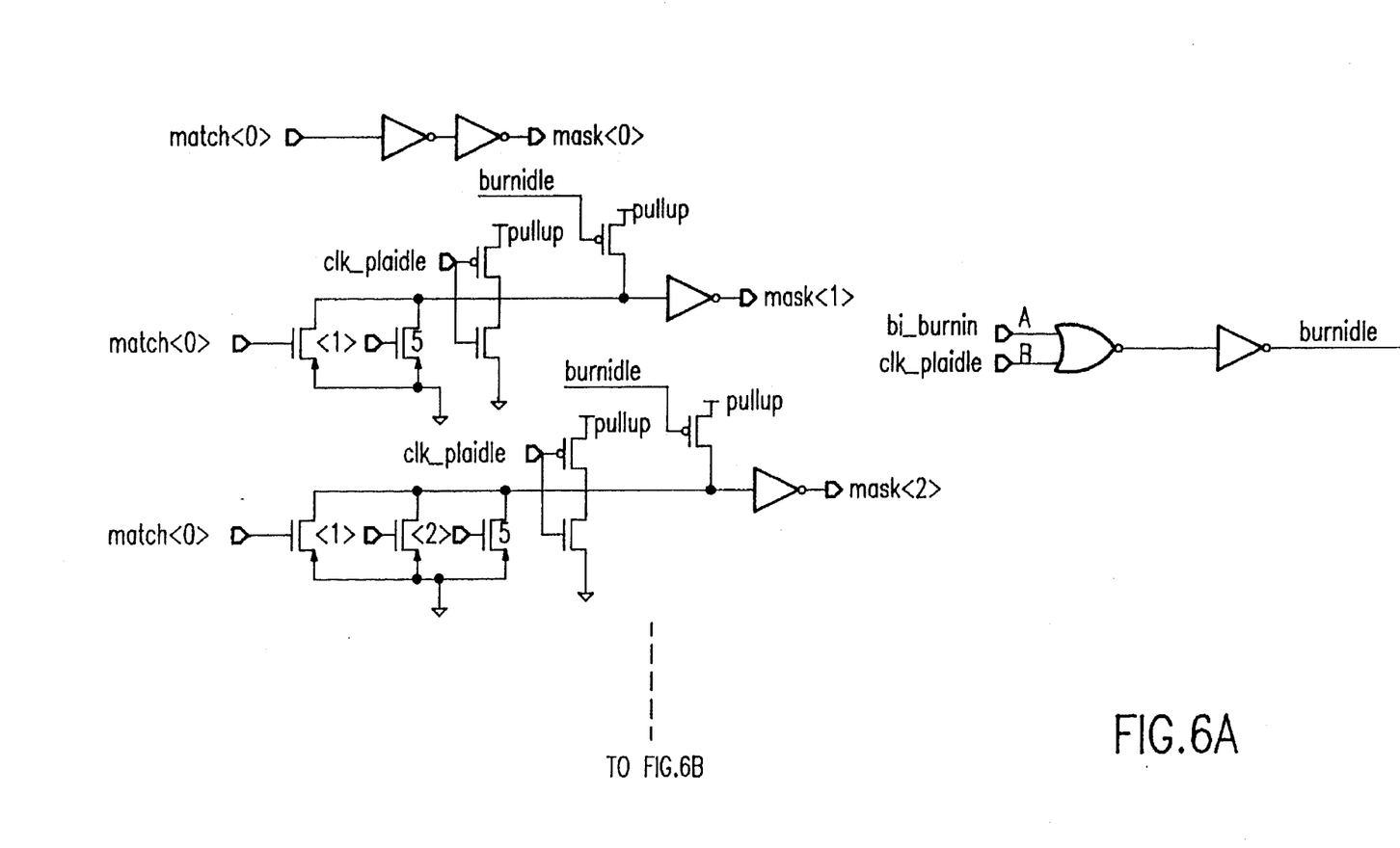
FIGS. 6A–6D illustrates a mask circuit in accordance with the present invention.
Figure 6B:
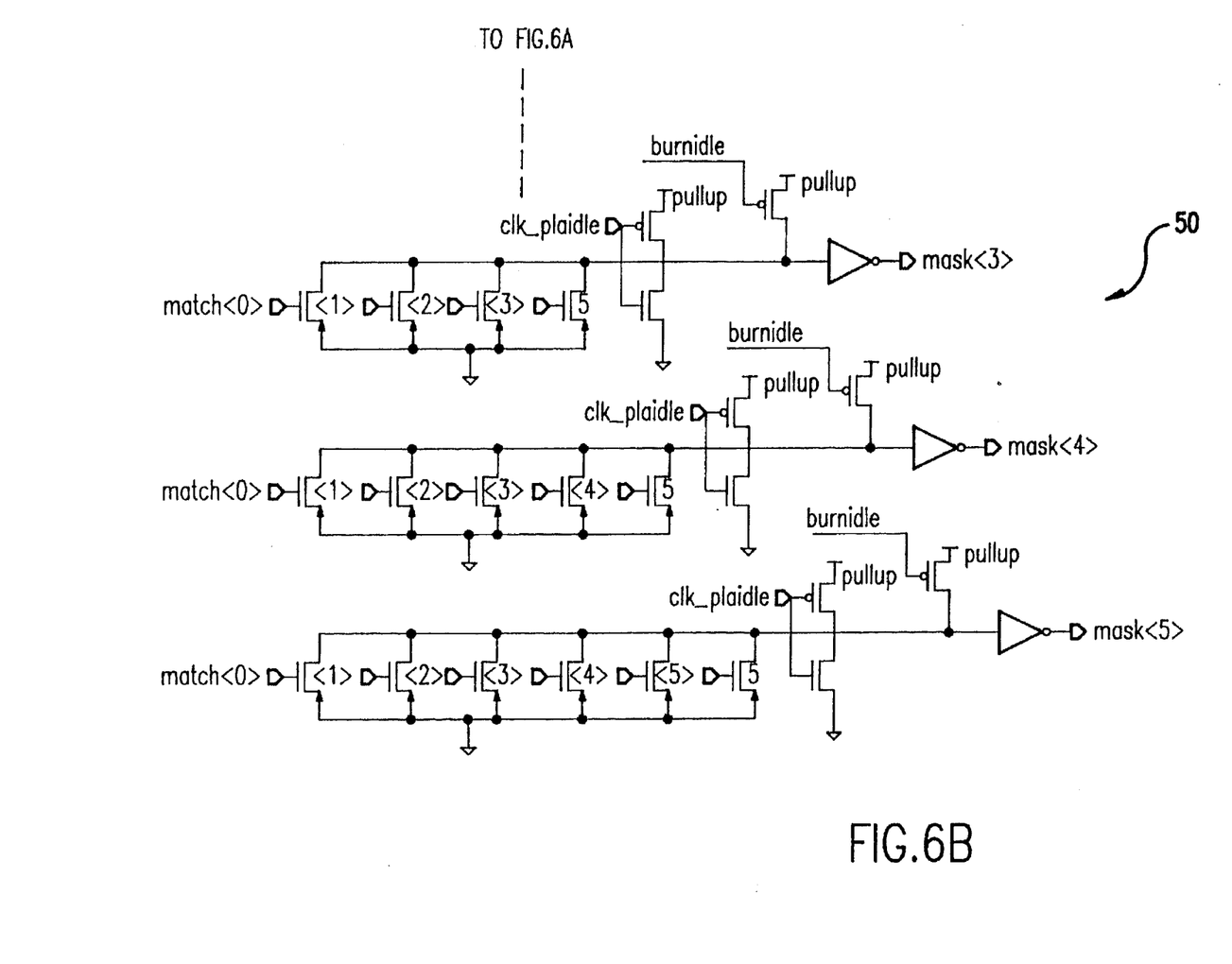
Figure 6C:
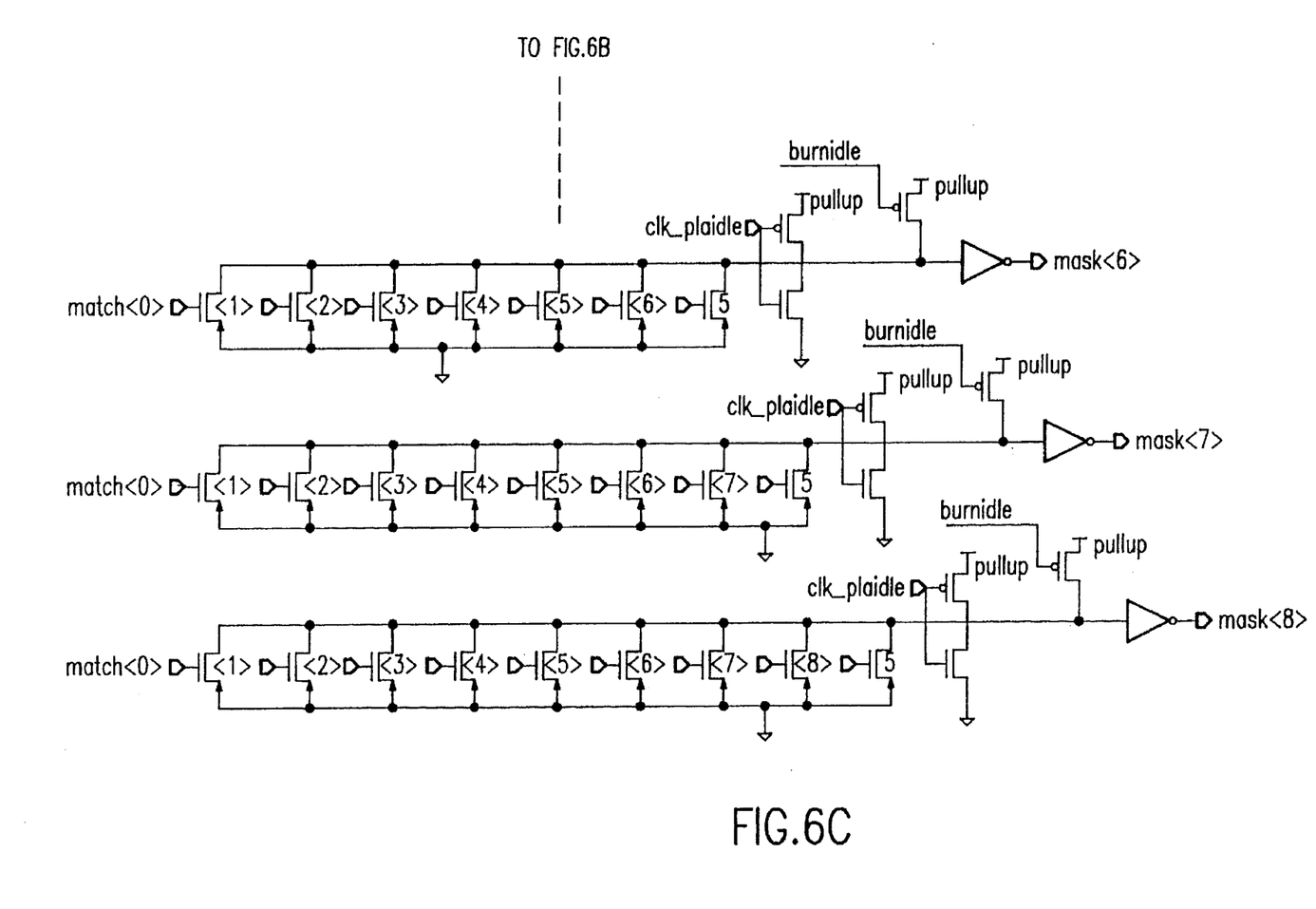
Figure 6D:
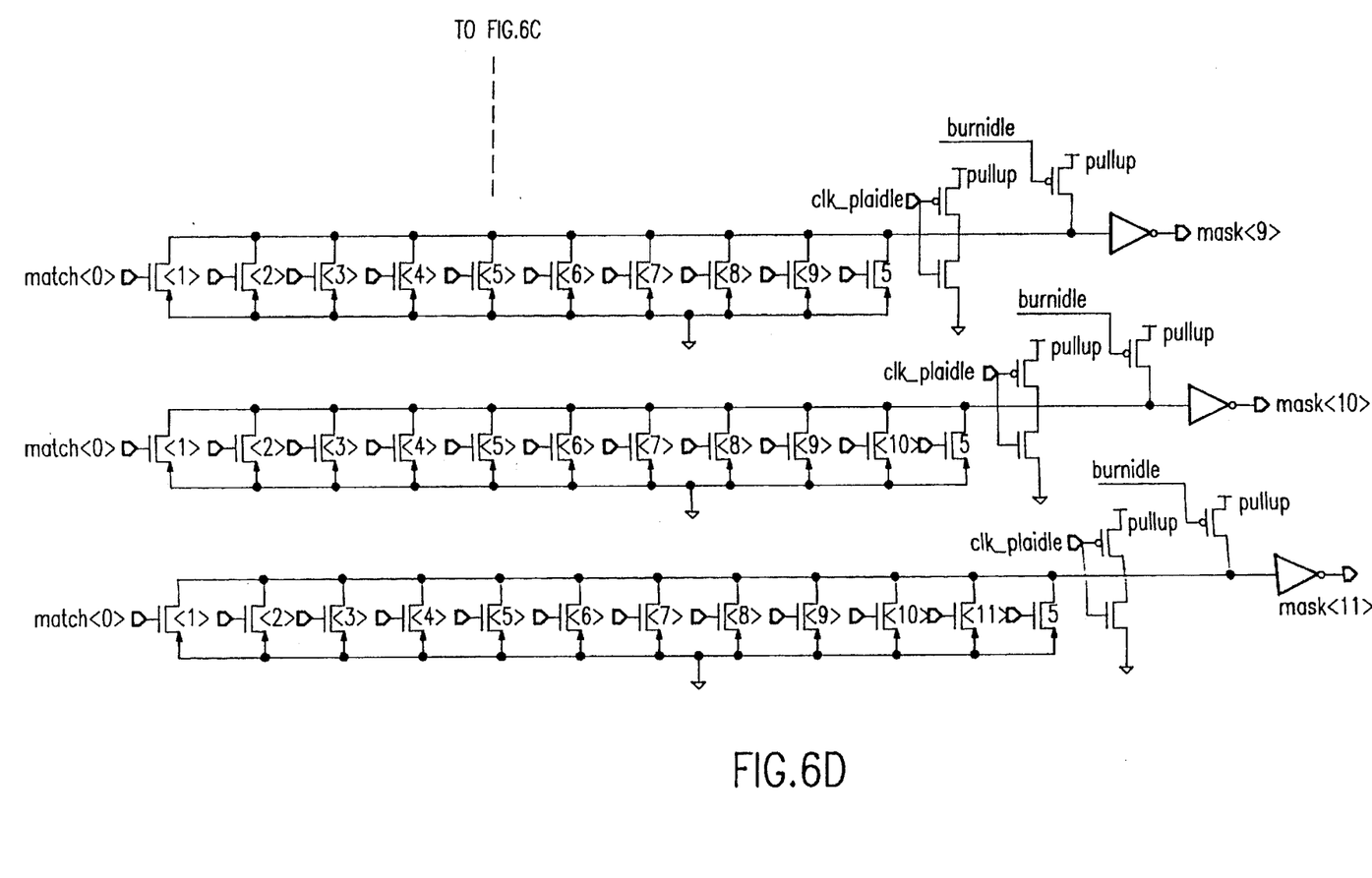

FIG. 4 illustrates a compare circuit 30 in accordance with the present invention. The compare circuit 30 topology uses a variation of the AND/OR ratio topology of FIG. 3 to compare two busses 'a' and 'b' for a match. This ratio compare circuit only works if both busses 'a' and 'b' are one-hot busses. A one-hot bus means only one bit on the bus can be a logical 1 and the rest have to be at logical 0.

The topology of priority circuit 30 differs from the ratio AND/OR circuit in FIG. 3 in that the priority circuit 30 compares each bit position of the two busses individually. The embodiment of FIG. 4 depicts eight inputs, a<0:7> and b<0:7> (corresponding to an 8-bit address), for each of the two busses, and one output 32. It is apparent that other address bit widths may be accommodated by the present invention.

In operation, if b<0> and a<0> are both at logical 1, then the intermediate node labeled "matchb" will be pulled down to a logical 0 and the following inverter 33 will produce a logical 1 at the output 32, indicating that the two busses match. The intermediate node "matchb" is pulled down (as was "stb" in FIGS. 2 and "m9b" in FIG. 3), when any one of the inputs turns on its corresponding NFET which overpowers the PFET pullups 31 and 35.

However, if a<0> and b<1> are both a 1, meaning b<0> is a 0, then the node "matchb" will be held at 1 by the PFET pullups 31 and 35 and the output 32 will be a logical 0 after passing through inverter 33, indicating that the two busses do not match.

This implementation reduces power consumption because power is only used during a match and not during the usual non-match case. The 615 PowerPC microprocessor instruction sequence queue has twelve entries that must be compared to the current instruction's memory address dependency. All twelve entries are compared to the current address at the same time, creating a twelve bit bus of match data 39 (see, FIGS. 1A–1B, match<11:0>).

FIGS. 5A–5D illustrates a priority circuit 40 in accordance with the present invention. The priority circuit 40 searches for the first logical 1 on the match bus 39 using the ratio OR topology.

Priority circuit 40 has as its input the twelve bit match bus 39, "match<11:0>", and a twelve bit output bus, "drp<11:0>". The circuit 40 searches through the match bus 39 looking for the first logical 1 and produces a logical 1 at the corresponding bit in the output bus 49 (see FIG. 1), "drp<11:0>". All of the following bits on the output bus 49 are then held at 0.

For example, if the "match" bus was 000010001010, then the output bus "drp" would be 000010000000. As shown in this example, the output is a bus 49 of equal length with only one output at a logical 1 state. The output bus can have only one of its bits at 1, all the rest will be at 0, and the output 1 will correspond to the first 1 on the input bus, namely, the bit with the highest priority. The output bits are generated in parallel to reduce delay.

FIGS. 6A–6D illustrates a mask circuit 50 in accordance with the present invention the mask circuit 50 is similar to the priority circuit 40 in that the mask circuit uses the ratio OR topology to find the first logical 1 on the input bus. Actually, the circuit uses multiple instances of the ratio OR topology to generate a mask bus for the input match bus 39 that masks out all positions of instructions that may have incorrect data.

Referring to FIGS. 6A–6D, the input match bus 39 consists of twelve bits, and the output mask bus 59 (see FIGS. 1A–1B) is also twelve bits, "mask<11:0". As with the priority circuit 40 shown in FIGS. 5A–5D, this circuit searches for the first logical 1 on the match bus 39 and produces a 1 at the corresponding output mask bit in FIGS. 6A–6D. Unlike the priority circuit 40, however, the mask circuit 50 then produces a logical 1 for each bit following the first logical 1 found. This flags the instructions after a conflict that must be flushed or discarded because they have incorrect data.

For example, if the input "match" bus was 000010001010, then the output bus "mask" would be 000011111111. As with the priority circuit 40, the output bits of mask circuit 50 are generated in parallel to reduce delay.

Figure 7A:
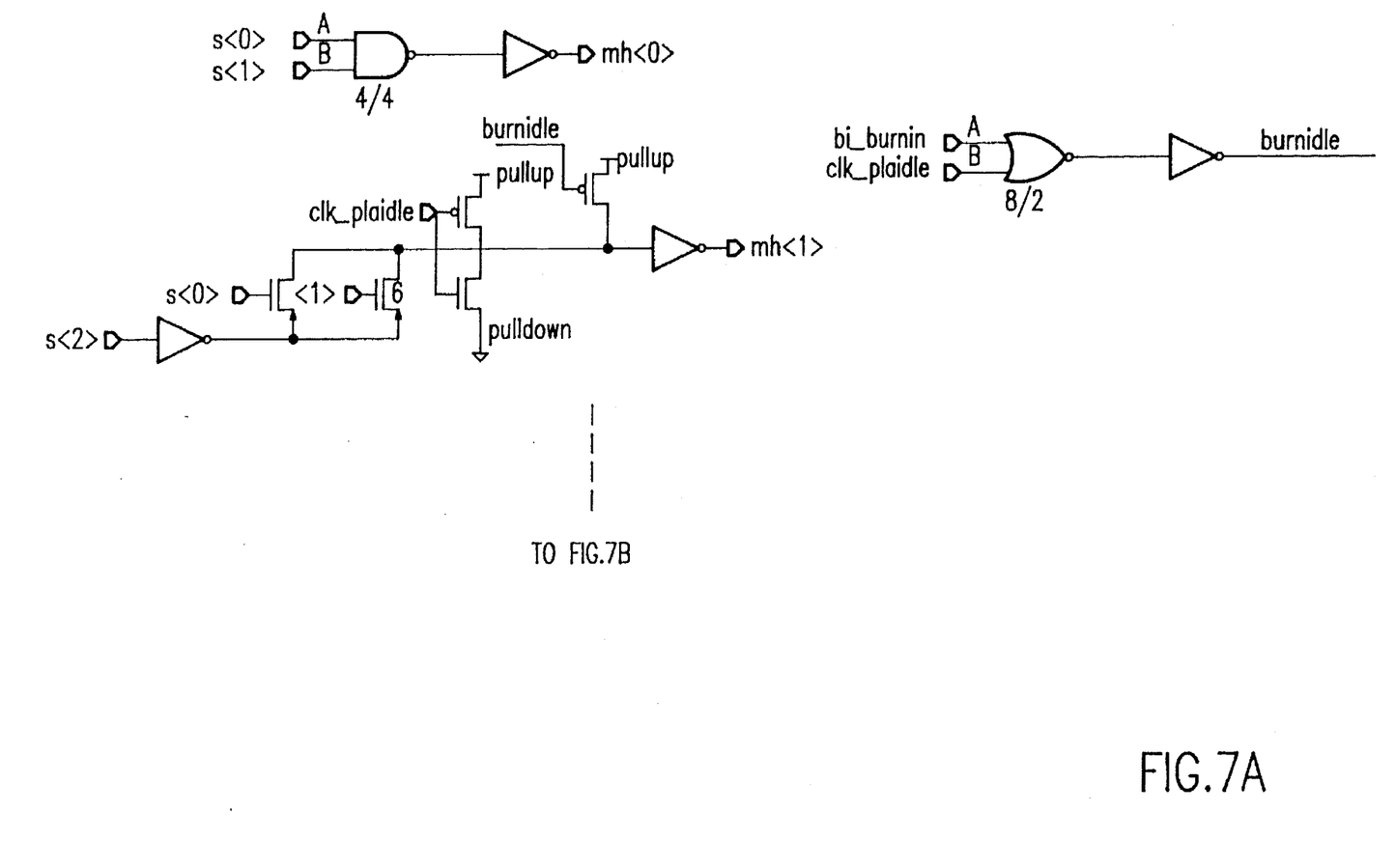
FIGS. 7A–7C illustrates a multiple hit circuit in accordance with the present invention.
Figure 7B:
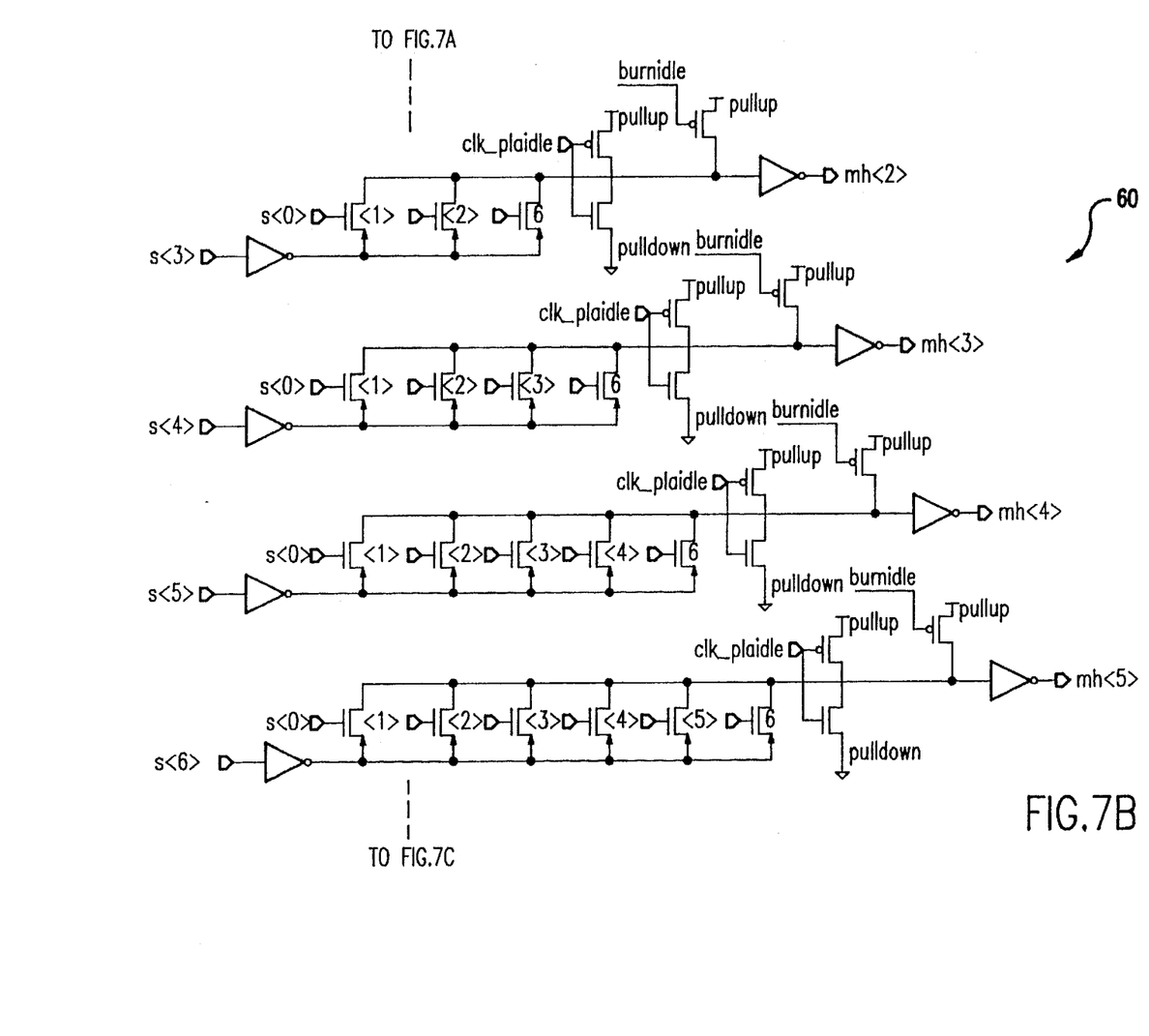
Figure 7C:
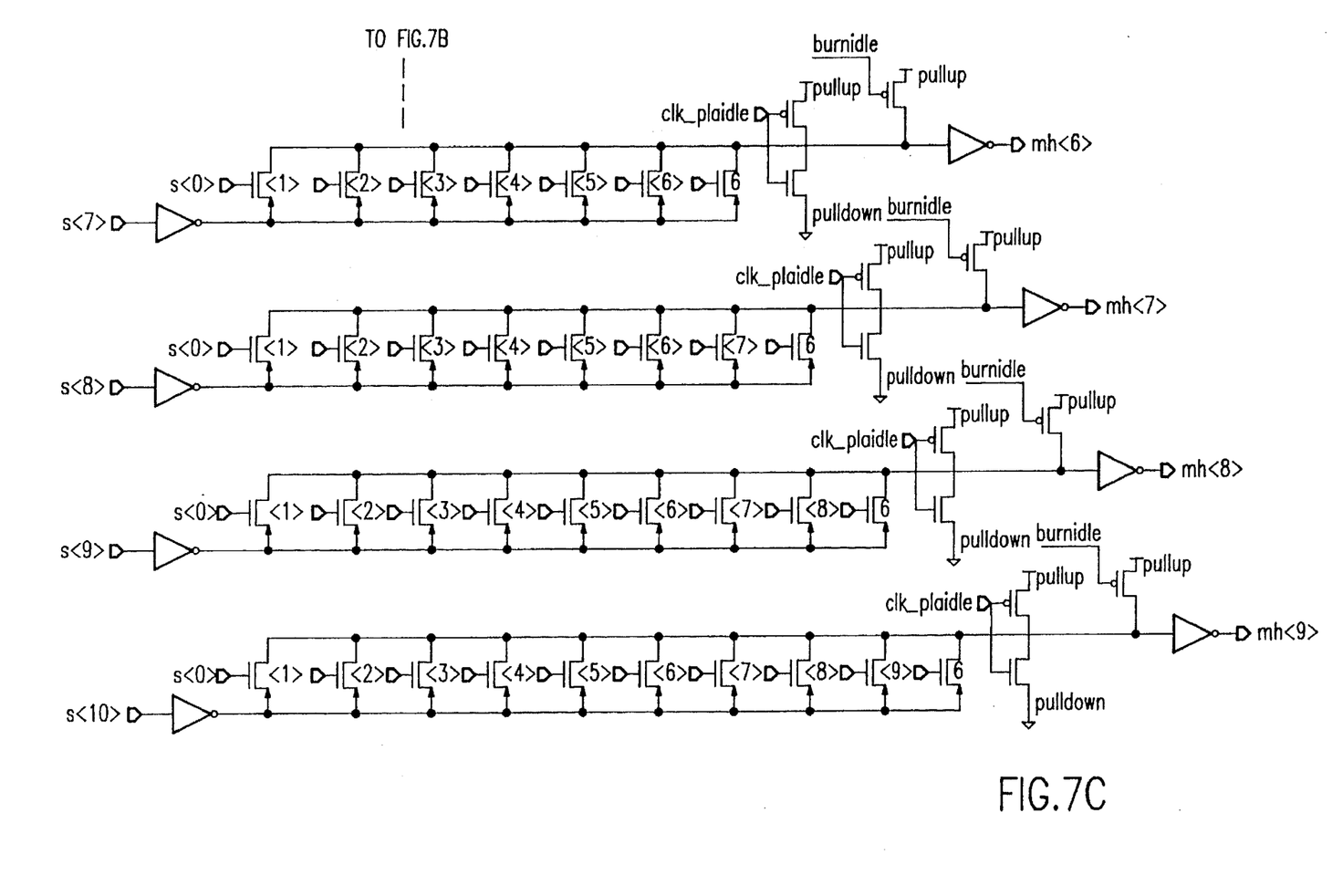

FIGS. 7A–7C illustrates a multiple hit circuit 60 in accordance with the present invention. The multiple hit circuit 60 uses two stages of ratio logic to check a bus for two or more of the bits being at a logical 1 state. The multiple hit circuit produces a single bit output that is a logical 1 if two or more of the bits on the input bus are a 1.

FIGS. 7A–7C illustrates an eleven bit input bus, s<0:10>, and a ten bit output bus, mh<0:9>. The first stage uses the ratio AND/OR topology as described with respect to FIG. 3. The circuit 60 compares each input bit individually with the rest of the input bus to see if it is a 1 and any other bit on the bus is also a 1.

The output of this stage is a bus one bit smaller than the input bus. The resulting output bus is then put through a ratio OR circuit 65 as shown in FIGS. 1A–1B to generate a single bit output indicating a multiple hit situation.

For example, if the input bus "s" was 00001000100, then the output bus mh<0:9> would be 0000000100 and the output of the following ratio OR circuit would be a 1.

By combining the above described ratio logic circuits with conventional CMOS logic circuits, a faster bus operation sequence may be achieved. The combination of ratio logic and CMOS for the bus operation circuits of the present invention minimizes delay for the compare and pattern detection operations—about 400 ps for the present invention versus about 1000 ps in previous embodiments that did not utilize ratio logic. In addition, the circuits are turned off when the processor is in the idle mode, and thus only use power when the processor is in the operating mode.

While the invention has been described in terms of the embodiments described above, those skilled in the art will recognize that the invention can be practiced with modification within the spirit and scope of the appended claims.

Having thus described my invention, what I claim as new and desire to secure by Letters Patent is as follows:

1. A match bus operation circuit in a superscalar microprocessor capable of out-of-order execution of instructions having first and second busses, comprising:

a ratio logic compare circuit for checking stored instructions and a current instruction for possible conflicts and generating a match bus data indicating matches between said first and second busses;

a ratio logic priority circuit coupled to said ratio logic compare circuit for receiving said match bus data and for generating a priority bus output indicating a first match of said match bus data;

a ratio logic mask circuit coupled to said ratio logic compare circuit for receiving said match bus and generating a mask bus output that flags all instructions after said first match for discarding; and a ratio logic multiple hit circuit coupled to said ratio logic compare circuit for indicating whether more than one instruction has matched;

wherein said ratio logic compare circuit comprises a logic controller for each bit of said first and second busses, wherein each bit of said first bus is individually compared with each bit of said second bus in the ratio logic compare circuit by the logic controller;

wherein the ratio logic compare circuit is composed of CMOS transistor components, and wherein a CMOS pull-up transistor is compatible with a CMOS pull-down transistor for producing logical 1 and logical 0 states, respectively indicating bus matches and bus mismatches.

2. A bus operation circuit as in claim 1, wherein the ratio logic priority circuit comprises means for identifying a first logical 1 on the match bus;

means for generating a logical 1 at a corresponding bit location on the priority bus; and means for generating a logical 0 at all bit locations on the priority bus following said first logical 1 bit location.

3. A bus circuit as in claim 2 wherein the ratio logic priority circuit is composed of CMOS transistor components, and wherein a CMOS pull-up transistor is compatible with a CMOS pull-down transistor for producing the logical 0 and logical 1 states.

4. A bus operation circuit as in claim 1, wherein said ratio logic mask circuit comprises means for identifying a first logical 1 on the match bus;

means for generating a logical 1 at a corresponding bit location on the mask bus; and means for generating a logical 1 at all bit locations on the mask bus following said first logical 1 bit location.

5. A bus circuit as in claim 4 wherein the ratio logic mask circuit is composed of CMOS transistor components, and wherein a CMOS pull-up transistor is compatible with a CMOS pull-down transistor for producing logical 0 and logical 1 states.

6. A bus operation circuit as in claim 1, wherein said ratio logic multiple hit circuit comprises means for identifying a first logical 1 on the match bus and for identifying whether any other bit on the match bus is a logical 1; and means for generating a single bit logical 1 output if said identifying means identifies another logical 1 on the match bus, otherwise generating a logical 0 output.

7. A bus operation circuit as in claim 6, wherein said means for generating a single bit output comprises a ratio OR circuit.

8. A bus circuit as in claim 7 wherein the ratio logic multiple hit circuit is composed of CMOS transistor components, and wherein a CMOS pull-up transistor is compatible with a CMOS pull-down transistor for producing logical 0 and logical 1 states.

* * * * *